United States Patent Office 3,328,451
Patented June 27, 1967

3,328,451
β-MERCAPTO ALKYL AMINO ALKYL ALKOXY SILANES
George F. Bulbenko, Levittown, Pa., assignor to Thiokol Chemical Corporation, Bristol, Pa., a corporation of Delaware
No Drawing. Filed Jan. 2, 1964, Ser. No. 335,426
6 Claims. (Cl. 260—448.8)

The present invention relates to a novel class of silicon containing compounds. More particularly the present invention relates to novel β-mercapto alkyl amino alkyl alkoxy silane compounds having the structure

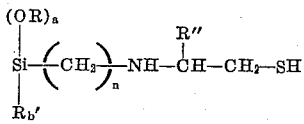

in which R is a lower alkyl group such as methyl, ethyl, propyl, isopropyl and butyl; R' may be H or a lower alkyl group such as methyl, ethyl, propyl, isopropyl and butyl; $a$ is a whole number of 1 to 3, $b$ is a whole number of 0 to 2 and $a+b=3$; $n$ is a whole number of 1 to about 6 and R" is H or a lower alkyl group such as methyl and ethyl. In a given case where more than one R or R' group is used in a given compound, the R or R' groups used may be the same or different alkyl groups where the R' groups used are not H.

Curable liquid polysulfide polymer based sealant and caulking compositions have long been known in the art. They are based on curable, liquid, mercaptan terminated polysulfide polymers. The structure and preparation of these polythiopolymercaptan polymers are disclosed in U.S. 2,466,963. These compositions are used in sealing and/or caulking operations to bond together, and/or fill seams between, various types of structural elements in various industries. The adhesive qualities of polysulfide polymers are such, however, as to usually require the use of an adhesive additive in the polysulfide polymer based sealant composition in order to insure a good bonding of the cured sealant to the substrate. The adhesive additives which have been available for this purpose to date, however, such as those of a phenolic nature, usually only provide for a polar, rather than a chemical, type bonding of the cured sealant to the substrate. This polar type of bonding is susceptible to attack by polar solvents such as water whereupon the bond tends to lose its strength and thus impair the utility of the sealant under conditions where it is subject to such attacks. Those in the art have desired to obtain adhesive additives which could be added to polysulfide polymer based sealant and caulking compositions to improve the adhesive qualities of such compositions particularly where they are to be used in the proximity of polar solvents such as water.

An object of the present invention is to provide a new and useful class of silicon containing compounds.

Another object of the present invention is to provide a novel class of adhesive additives for liquid polysulfide polymer based sealant and caulking compositions.

Another object of the present invention is to provide a novel class of compounds which can be either admixed in, or used as a primer with, liquid polysulfide polymer based sealant and caulking compositions to improve the adhesion properties thereof.

It has been unexpectedly found, according to the present invention, that the novel compounds of the present invention will greatly enhance the adhesive properties of liquid polysulfide polymer based sealant and caulking compositions when either admixed therein or used therewith as a primer.

Illustrative of the novel compounds of the present invention is β-mercapto ethyl amino propyl triethoxy silane which has the structure

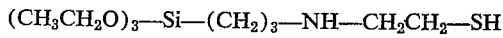

This compound is a water white liquid having a molecular weight of 281, a boiling point of 98° C./0.2 mm. Hg, a density of 0.96 at 26° C. and a refractive index ($n_D^{26°\,C.}$) of 1.4500. It is miscible in acetone, benzene, chloroform, dioxane, ethanol, ethylacetate, toluene and water (upon hydrolysis).

Another compound of the present invention is β-mercapto ethyl amino butyl diethoxy methyl silane which has the structure

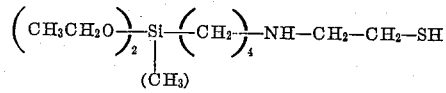

This compound is a water white liquid having a molecular weight of 265, a boiling point of 112–114° C./0.06 mm. Hg, a density of 1.00 at 26° C. and a refractive index ($n_D^{26°\,C.}$) of 1.4600. It is miscible in acetone, benzene, toluene, carbon tetrachloride and chloroform.

The novel mercapto amino silane compounds of the present invention may be prepared by the mercaptoalkylation of gamma-amino-alkylene alkoxy silanes with alkylene sulfides under pressures of about 5 to 100 atmospheres and at temperatures of about 30 to 200 and preferably about 100° C. At 100° C. the reaction can be completed in about 20 to 24 hours. Catalysts are not required for this reaction. Alkylene sulfides which may be used include ethylene sulfide, propylene sulfide and butylene sulfide.

The gamma-amino-alkylene alkoxy silanes which may be used have the structure

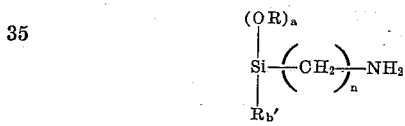

in which R, R', $a$, $b$ and $n$ are as defined above.

The reaction proceeds as follows:

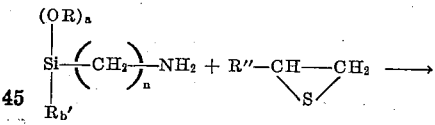

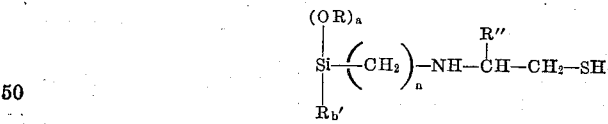

Yields of up to 90 or more percent can be obtained with this procedure.

The polysulfide polymers which form the polymer base of the sealant or caulking compositions with which the novel compounds of the present invention are used as adhesive additives are those liquid polythiopolymercaptan polymers as are disclosed and claimed, as noted above, in U.S. Patent 2,466,963. The most preferred of such polymers for the purposes of making sealant or caulking compositions are those having a molecular weight of about 500 to 4000. Polymers having such molecular weights are preferred in that they allow for the most efficient cure times.

The liquid polysulfide polymer curing agents which may be used in sealant compositions with the novel adhesive additive compounds of the present invention include all those materials known to the art as liquid polysulfide polymer curing agents such as polyepoxy resins, lead peroxide, calcium peroxide, barium peroxide, tellurium dioxide and the various chromate salts as are disclosed in U.S. 2,964,503. About 2.5 to 10 parts by weight of one or more of such curing agents should be used in such compositions, per 100 parts by weight of liquid polysulfide polymer being used.

With the novel adhesive additives of the present invention, a strong bonding of the cured sealant composition to the substrate can be obtained in about 2 to 24 hours at room temperature (about 25° C.).

The substrates which can be treated with compositions containing the novel adhesive additive compounds of the present invention include those of a wood nature, those of a siliceous nature such as glass and those of a metallic nature such as aluminum, iron and steel as well as zinc and/or chrome coated iron or steel.

Curable compositions made or used with the novel adhesive additive compounds of the present invention may also contain various types of inert materials commonly employed in liquid polysulfide polymer based sealant and caulking compositions such as fillers, plasticizers, pigments, ultraviolet light stabilizers, cure accelerators, and the like.

Where the silane adhesive additive compounds of the present invention are to be used as priming agents they may be applied to the surface of the substrate(s) being treated in the form of a solution so as to provide thereon at least a monomolecular layer of the silane material. The solvent medium employed in such a case should be a fairly volatile material such as ethyl alcohol, toluene, Cellosolve, methanol, n-butanol, isobutanol, chloroform, ethyl acetate, acetone and benzene.

Curable compositions made or used with the novel adhesive additives of the present invention have a pot life (working life) of about 0.5 to 24 hours and the pot life of these compositions must be taken into consideration when admixing and/or bringing the curing agent in contact with the adhesive and/or liquid polysulfide polymer.

The following examples are merely illustrative of the present invention and are not intended as a limitation upon the scope thereof.

EXAMPLE 1

*Preparation of β-mercapto ethyl amino propyl triethoxy silane*

Into a stainless steel bomb there was charged 44 grams (0.20 mol) of gamma-amino propyl triethoxy silane (i.e., $(CH_3CH_2O)_3Si-(CH_2)_3-NH_2$), 9 grams of ethylene sulfide (0.15 mol) and 100 milliliters of sodium dried benzene. No exotherm was observed at this time. The system was purged with nitrogen and the bomb was capped and placed in a 100° C. oven for about 20 hours. The bomb was then removed from the oven and chilled to room temperature and opened. No polymer formation was observed. The reaction mixture was distilled at atmospheric pressure at a pot temperature of 70° C. No unreacted monomer was removed but some polymeric ethylene sulfide did form in the distillation flask under slight vacuum. Eighty-one grams of benzene were recovered. At a higher vacuum of more than 1 millimeter of mercury, a small amount of high boilers was collected in a $CO_2$/acetone trap. This material gave a weak test for SH and the amount of material recovered was 2 grams. The residue in the distillation flask was a milky tan colored liquid weighing about 41 grams. This residue was taken up in dry benzene and filtered. The filtrate was freeze dried and after the freeze drying some solids formed and the filtrate was filtered again. A net weight of 38 grams of filtrate was obtained. About 25 grams of the filtrate was subject to fractional distillation. Cut #1 was taken at 50–52° C. at 0.2 millimeter of mercury. Eight grams was obtained, which, upon analysis showed a trace amount i.e., 0.11%, of SH and a nitrogen content of 6.3%. Cut #2, the β-mercapto ethyl amino propyl triethoxy silane, was taken at 97–98° C. at 0.2 mm Hg. It was a water white liquid. Ten and a half grams were obtained, which, upon analysis showed an SH content of 11.4% and a nitrogen content of 4.8%. The refractive index of the product at 26° C. was 1.4500 and its density at 26° C. was 0.96. The calculated percent SH and percent N for β-mercapto ethyl amino propyl triethoxy silane are 11.75 and 4.98% respectively. The residue remaining in the distillation flask weighed 5 grams.

EXAMPLE 2

*Preparation of β-mercapto ethyl amino butyl diethoxy methyl silane*

A stainless steel bomb was charged with 61.5 grams of gamma-amino butyl diethoxy methyl silane (i.e., $(CH_3CH_2O)_2(CH_3)Si(CH_2)_4NH_2$) 36 grams of ethylene sulfide and 150 ml. of sodium dried benzene. The bomb was flushed with nitrogen, sealed and placed in a 100° C. oven for 24 hours. At the end of this time, the bomb was chilled and then opened and the reaction system solution was filtered and a slight bit of residue collected. The residue gave a strong test for mercaptan. The benzene was removed from the solution by distillation. The pot product was fractionally distilled and 55 grams was recovered at 142–150° C. at 1 mm. mercury. Upon redistillation, 36 grams of β-mercapto ethyl amino butyl diethoxy methyl silane were obtained at 112–114° C. at .06 millimeters of mercury. Upon analysis, this material had a mercaptan content of 11.9 as compared with a calculated value of 12.45 and a nitrogen content of 5.0 as compared with a calculated content of 5.28. The product had a refractive index of $n_D^{26}$ 1.4600, a density at 28.5° C. of 0.96. The material was miscible in acetone, benzene, toluene, carbon tetrachloride and chloroform.

EXAMPLE 3

β-mercapto ethyl amino propyl triethoxy silane produced as in Example 1 was used in this example as a primer with which to prime various substrates before attempting to bond a polysulfide polymer based sealant composition thereto. The substrates used were aluminum, stainless steel and glass. The silane compound was used in the form of ethanol solution by dissolving 12 parts by weight of the silane compound in 88 parts by weight of ethanol. The priming solution was then applied to the surface of the substrate by lightly wiping the surface once with a cotton swab saturated therewith. The primed substrate was allowed to stand overnight at room temperature during which time the solvent evaporated. A bead of the curable polysulfide polymer based sealant composition was then applied to the primed substrate and cured thereon for one week at room temperature. At the end of this time one set of coated panels was tested for adhesion of the bead to the panels and a second set of panels was immersed in tap water for one week at room temperatures before evaluating the adhesion of the sealant beads to this latter set of panels. The sealant formulation used was:

| | Parts by wt. |
|---|---|
| LP–32 polysulfide polymer | 100 |
| Witcarb RD (calcium carbonate) | 30 |
| Titanox RA50 (titanium dioxide) | 10 |
| HiSil 233 (hydrated silica) | 3 |
| Calcium stearate (thioxotropic agent) | 1 |
| Stearic acid | 1 |
| Sulfur | 0.1 |
| | 145.1 |

LP–32 polysulfide polymer has essentially the structure $$HS(C_2H_4-O-CH_2-O-C_2H_4-S-S)_{23}C_2H_4\\-O-CH_2-O-C_2H_4-SH$$

with about 0.5% crosslinking or branching by trichloropropane.

Prior to its application to the substrates the above sealant formulation was mixed with 10.3 parts by weight, per 100 parts by weight of this formulation, of a lead peroxide and Aroclor 1254 curing paste admixture containing about 50% PbO₂. Aroclor 1254 is a chlorinated biphenyl plasticizer containing about 54% chlorine. The adhesion test consisted of attempting to peel the cured sealant beads from the substrates. If the bead peeled off, it was noted as an adhesive failure. If the bead could not be removed without tearing the bead, this was noted as a cohesive failure. Borderline instances were noted as slight cohesive failures. The tests indicated only cohesive failures occurred.

In further tests, the same sealant and curing paste compositions given above were used with β-mercapto ethyl amino propyl triethoxy silane included as an adhesion additive according to the recipe:

|  | Parts by Weight | |
|---|---|---|
|  | A | B |
| Polysulfide sealant formulation | 140 | 140 |
| Lead curing paste | 15 | 15 |
| β-mercapto ethylamino propyl triethoxy silane | 1 | 3 | to form the curable sealants A and B. They were applied as beads in duplicate to clean unprimed aluminum, stainless steel and glass panels and left to cure in air for one week at room temperature. One set of duplicates was tested for adhesion, whereupon all beads showed cohesive failure. The other set of panels was then immersed in tap water for a week at room temperature before testing and thereupon showed only cohesive failures.

What is claimed is:

1. A compound having the structure

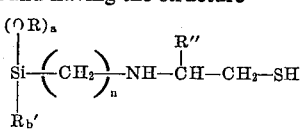

in which R is a lower alkyl group; R' and R'' are selected from the group consisting of H and lower alkyl groups; $a$ is a whole number of 1 to 3, $b$ is a whole number of 0 to 2 and $a+b=3$ and $n$ is a whole number of 1 to about 6.

2. A compound as in claim 1 in which R'' is H.
3. A compound as in claim 2 in which R is ethyl.
4. A compound as in claim 3 in which R' is methyl.
5. $(CH_3CH_2O)_3Si(CH_2)_3NH-CH_2-CH_2-SH$.
6.

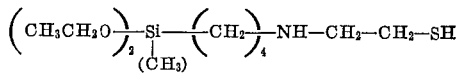

References Cited

UNITED STATES PATENTS 3,032,577  5/1962  Morehouse _____ 260—448.2
3,220,878  11/1965  Pines _____ 260—448

OTHER REFERENCES

Reid, E. E.: Organic Chemistry of Bivalent Sulfur, N. Y., Chemical Publishing Co., 1960, vol. III, p. 17.

TOBIAS E. LEVOW, *Primary Examiner.*

HELEN M. McCARTHY, *Examiner.*

J. G. LEVITT, P. F. SHAVER, *Assistant Examiners.*